US010547817B2

(12) United States Patent
Hermanson et al.

(10) Patent No.: US 10,547,817 B2
(45) Date of Patent: Jan. 28, 2020

(54) PROGRAMMABLE LASER DEVICE

(71) Applicant: Mr. Christmas Incorporated, New York, NY (US)

(72) Inventors: Leslie Hermanson, Brooklyn, NY (US); Qunde Zhang, Shanghai (CN)

(73) Assignee: MR. CHRISTMAS INCORPORATED, New York, NY (US)

( * ) Notice: Subject to any disclaimer, the term of this patent is extended or adjusted under 35 U.S.C. 154(b) by 0 days.

(21) Appl. No.: 15/950,441

(22) Filed: Apr. 11, 2018

(65) Prior Publication Data

US 2018/0302598 A1    Oct. 18, 2018

Related U.S. Application Data

(60) Provisional application No. 62/484,557, filed on Apr. 12, 2017.

(51) Int. Cl.
*H04N 9/31*       (2006.01)
*G06F 3/16*       (2006.01)
*G06F 3/023*      (2006.01)
*G06F 3/0488*     (2013.01)

(52) U.S. Cl.
CPC ......... *H04N 9/3129* (2013.01); *G06F 3/0233* (2013.01); *G06F 3/04886* (2013.01); *G06F 3/165* (2013.01); *H04N 9/3144* (2013.01); *H04N 9/3161* (2013.01)

(58) Field of Classification Search
CPC .... G03B 21/006; G03B 21/16; G03B 21/118; G03B 21/147; H04N 9/3129; H04N 9/3144; H04N 9/3161; H04N 9/3194; G06F 3/01; G06F 3/017; G06F 3/165; G06F 3/0233; G06F 3/0238; G06F 3/0488; G06F 3/0489; G06F 3/04886
See application file for complete search history.

(56) References Cited

U.S. PATENT DOCUMENTS

| 2002/0109822 | A1* | 8/2002 | Matsuda | G03B 21/145 |
| | | | | 353/119 |
| 2006/0098167 | A1* | 5/2006 | Sato | G03B 21/26 |
| | | | | 353/35 |
| 2008/0239246 | A1* | 10/2008 | Yamamoto | G03B 21/26 |
| | | | | 353/69 |
| 2010/0304722 | A1* | 12/2010 | Tanaka | H04M 1/0272 |
| | | | | 455/414.1 |

(Continued)

*Primary Examiner* — Sultan Chowdhury
(74) *Attorney, Agent, or Firm* — Venable LLP

(57) ABSTRACT

A programmable laser device is configured to project a laser image, and includes an outer casing, a lens provided on a side surface of the outer casing, and a power switch that switches the programmable laser device between an ON state and an OFF state. A memory stores one or more programs, each including at least one laser image. A control panel has a control panel display that includes a keyboard having character buttons and a SEND button. A processor is configured to, when the programmable laser device is in the ON state, execute the one or more programs selected via the control panel. In addition, the programmable laser device includes a laser configured to display any one of the laser images of the one or more programs stored in the memory, and the laser image input via keyboard of the control panel.

17 Claims, 5 Drawing Sheets

(56) References Cited

U.S. PATENT DOCUMENTS

| | | | |
|---|---|---|---|
| 2012/0274909 A1* | 11/2012 | Schulz | G02B 27/104 353/31 |
| 2013/0070214 A1* | 3/2013 | Luciano | G03B 21/10 353/79 |
| 2014/0111690 A1* | 4/2014 | Kim | H04N 21/42203 348/565 |
| 2015/0130853 A1* | 5/2015 | Hada | H04N 9/3155 345/690 |
| 2015/0161099 A1* | 6/2015 | Lee | G06F 9/454 345/171 |

* cited by examiner

PROGRAMMABLE LASER DEVICE

FIELD OF THE INVENTION

Our invention relates to a programmable laser device, and in particular, to a programmable laser device having a built-in control panel.

SUMMARY OF THE INVENTION

An object of the invention is to provide a programmable laser device having a control panel. Another object of the invention is to provide a programmable laser device having a built-in over heat protection device.

In a preferred embodiment, the programmable laser device is configured to project a laser image, and comprises an outer casing, a lens provided on a side surface of the outer casing, and a power switch that switches the programmable laser device between an ON state and an OFF state. A memory stores one or more programs, each of the one or more programs including at least one laser image. A control panel has a control panel display that includes a keyboard having character buttons and a SEND button, and a laser image display portion that displays the laser image to be projected. The control panel is configured to receive a laser image based on character buttons input via the keyboard or based on one or more programs selected from the one or more programs stored in the memory. A processor is configured to, when the programmable laser device is in the ON state, execute the one or more programs selected via the control panel. A laser is configured to display any one of the laser images of the one or more programs stored in the memory, and the laser image input via the keyboard of the control panel. In addition, the programmable laser device comprises a built-in over heat protection device having a timer, wherein, when the programmable laser device is in the ON state, and the timer reaches a predetermined running time, the built-in over heat protection device switches the programmable laser device from the ON state to the OFF state.

In another preferred embodiment, the programmable laser device is configured to project a laser image, and comprises an outer casing, a lens provided on a side surface of the outer casing, and a power switch that switches the programmable laser device between an ON state and an OFF state. A memory stores one or more programs, each of the one or more programs including at least one laser image. A control panel has a control panel display that includes a keyboard having character buttons and a SEND button, and that is configured to receive a laser image based on character buttons input via the keyboard or based on one or more programs selected from the one or more programs stored in the memory. A processor is configured to, when the programmable laser device is in the ON state, execute the one or more programs selected via the control panel, and a laser is configured to display any one of the laser images of the one or more programs stored in the memory, and the laser image input via the keyboard of the control panel.

DETAILED DESCRIPTION OF THE INVENTION

Figure 1:
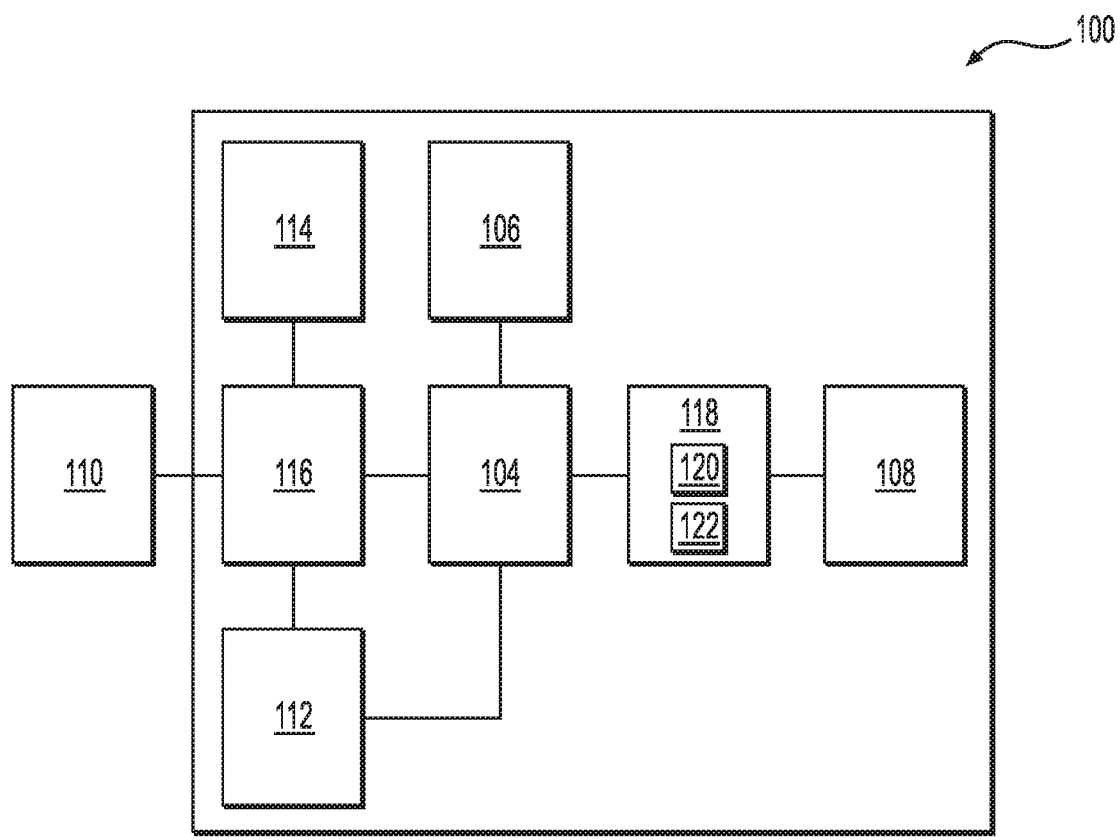
FIG. 1 is a schematic diagram of a programmable laser device according to a preferred embodiment of the invention.

FIG. 1 shows a schematic diagram of a programmable laser device 100 according to a preferred embodiment of the invention. The programmable laser device 100 may be used indoors or outdoors for displaying laser images, messages, animations, or other objects 102 (not shown), and for playing music. The programmable laser device 100 comprises a CPU 104 and a memory 106. The memory 106 is configured to store a plurality of programs featuring the laser image 102 capable of being displayed by a laser 108. The programmable laser device 100 is connected to an external power supply 110, and is capable of functioning at approximately 60 Hz under 20 W of power, and is rated for 120 V.

The programmable laser device 100 also includes the laser 108, such as a type 3A laser, although other types of lasers may be used. The wavelength of the laser 108 is, for example, 532 nm (green laser), or 635 nm (red laser), and the output power is, for example, less than 5 mW. The laser 108 has a relatively short warm-up period T, allowing for display of the laser image 106 shortly after switching the programmable laser device 100 ON.

An operation temperature of the programmable laser device 100 ranges from −20° C. to 35° C. (i.e., from −4° F. to 95° F.). A built-in over heat protection device 112 is provided in the programmable laser device 100, such that the programmable laser device 100 will automatically switch OFF in the event the operation temperature exceeds a maximum value. The maximum value of the operation temperature may be 35° C. (or 95° F.) or less. The programmable laser device 100 may also include a power switch 116 that switches the programmable laser device 100 between an ON state and an OFF state, and a timer 114 that can be activated when the programmable laser device 100 is switched to the ON state. The timer 114 may be set to run for a predetermined time of, for example, six hours. When the timer 114 reaches the predetermined time, the power switch 116 of the programmable laser device 100 may automatically switch the programmable laser device 100 to the OFF state.

When the built-in over heat protection device 112 is activated, the programmable laser device 100 is switched to the OFF state, and the timer 114 may be activated to run for a predetermined amount of time for a cooling period. For example, the predetermined amount of time of the cooling period may be, for example, between fifteen and thirty minutes. After the timer 114 runs for fifteen minutes to thirty minutes, the programmable laser device 100 will switch to the ON state. The built-in over heat protection device 112 serves to protect the laser 108 from damage. In addition, the programmable laser device 100 is adapter operated.

The laser image 102 is generated as a graphic using a two-scanner system 118, shown in FIG. 1, that includes an x-axis scanner 120 and a y-axis scanner 122. Characters 124, in the form of letters, numbers, symbols, images, and/or animations, are input into the two-scanner system 118, and are mechanically translated in the two-scanner system 118 to project from the laser 108 of the programmable laser device 100.

A speaker 126 (not shown) and a volume control portion 128 (not shown) may also be provided in the programmable laser device 100. The volume control portion 128 may be a dial, and allows for adjustment of a volume of the music.

Figure 2:
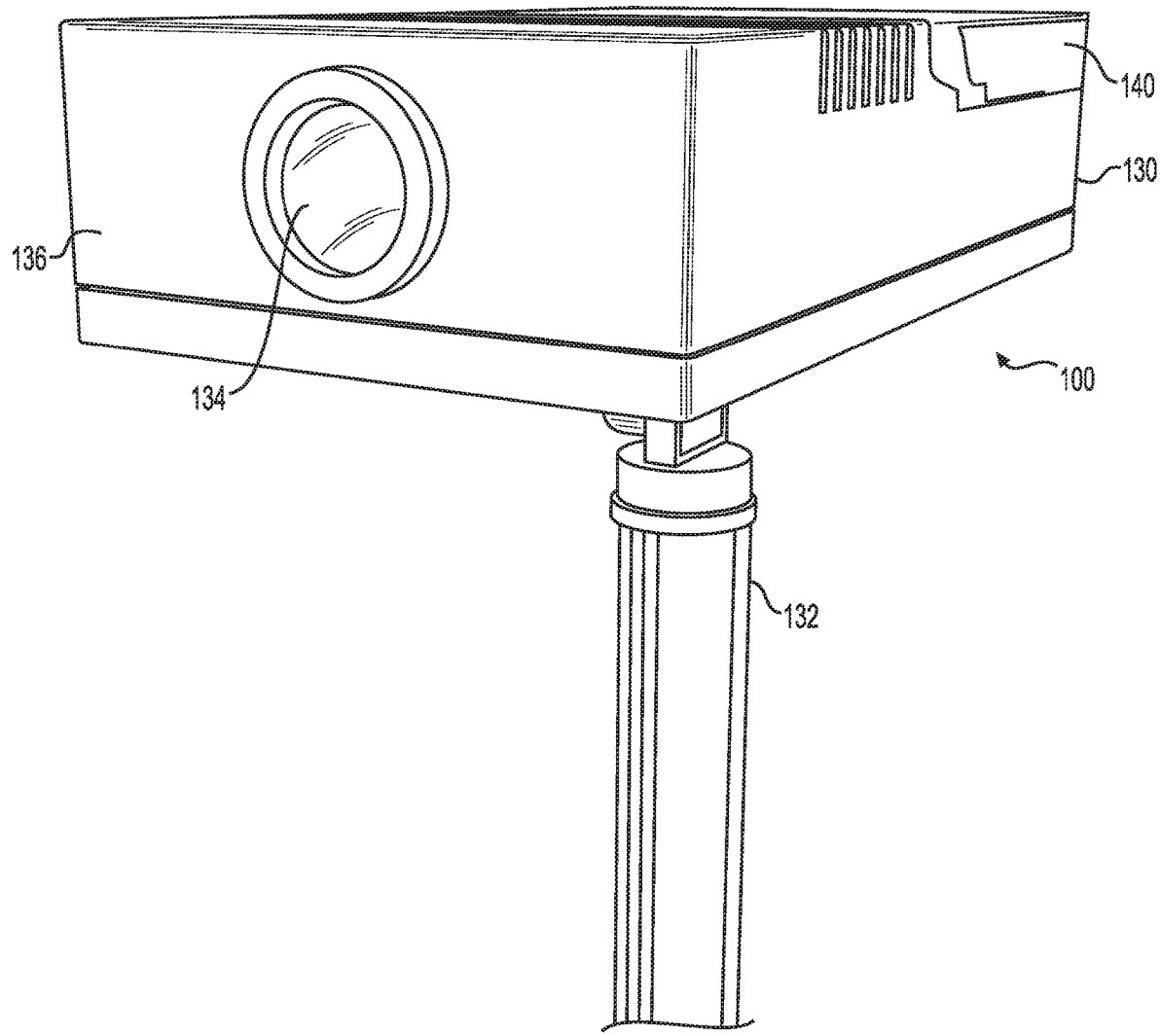
FIG. 2 is a perspective view of the programmable laser device according to a preferred embodiment of the invention.

As shown in FIG. 2, the programmable laser device 100 has an outer casing 130 and may be connected to a stand 132 or other supporting means. A lens 134 is provided on a side surface 136 of the outer casing 130 for projection of the laser image 102 using the laser 108. The lens 134 may be made of plastic, glass, or any suitable translucent material.

The laser image 102 may comprise a message having, for example, up to ninety characters 134. For example, a personalized message, such as "HAPPY 5TH BIRTHDAY JACK!!" may be projected as the laser image 102 using the laser 108. The memory 106 can store personalized laser images 102, e.g., ten, for future use.

Figure 3:
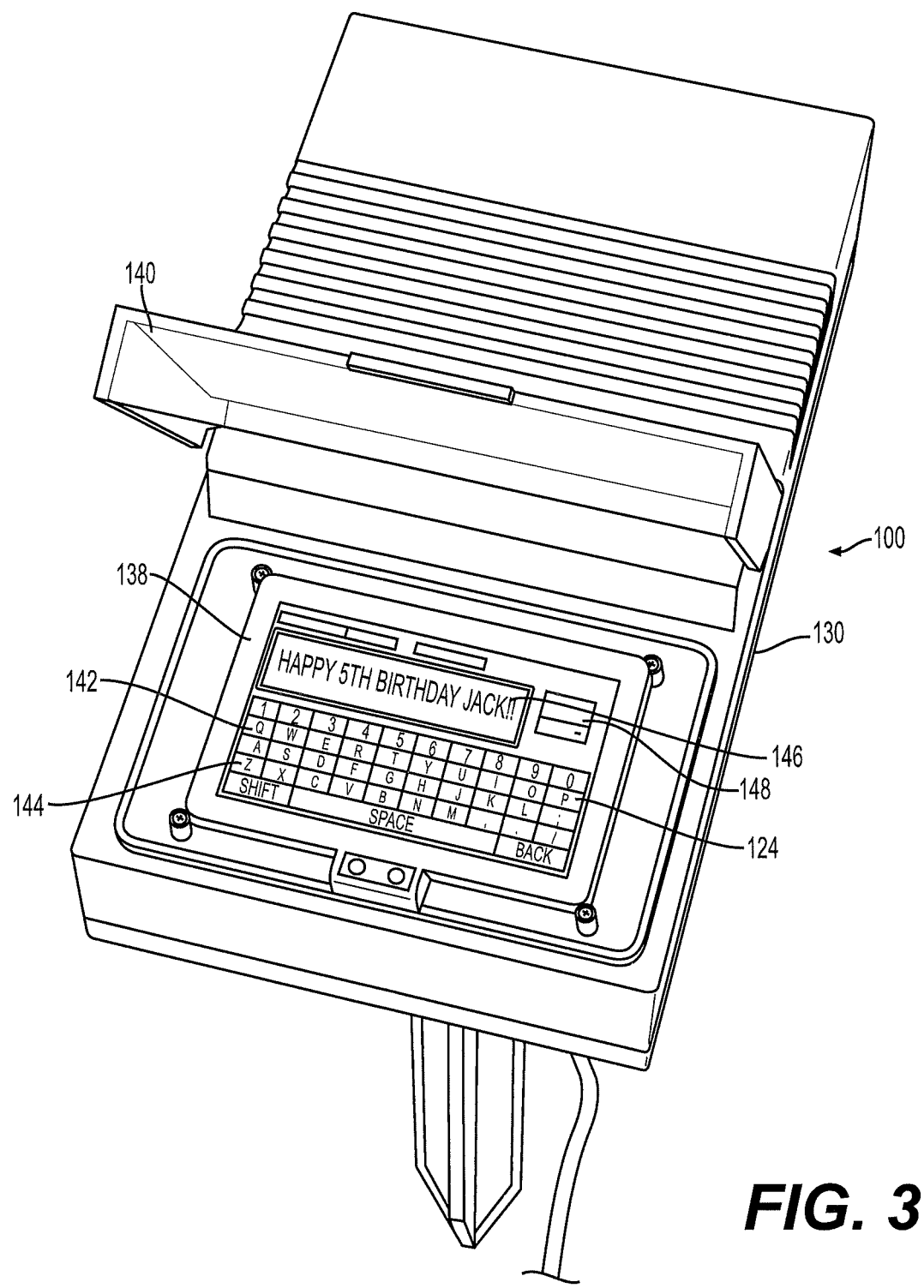
FIG. 3 is a perspective view of the programmable laser device in which a control panel cover is open, according to a preferred embodiment of the invention.
Figure 4:
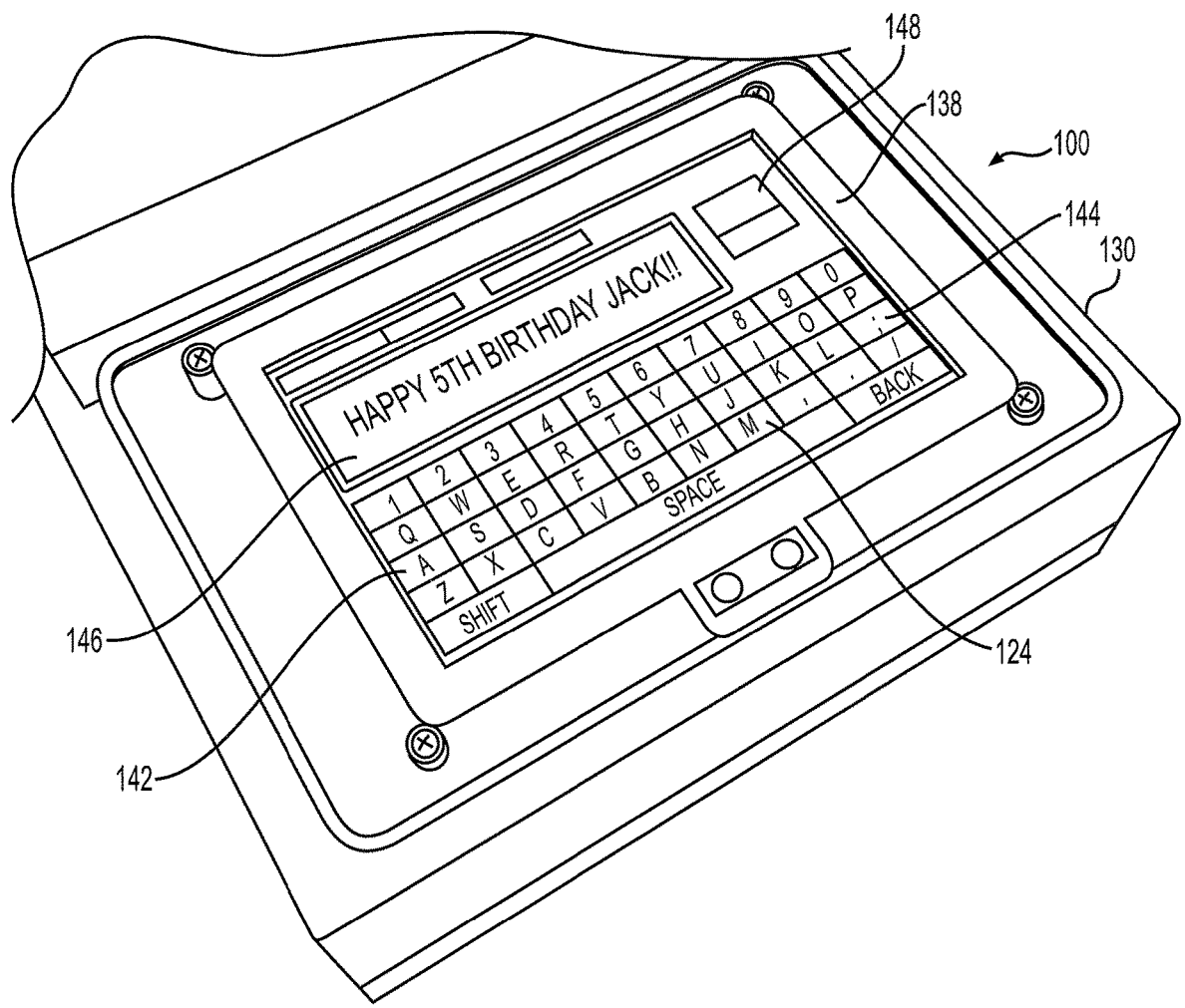
FIG. 4 is a perspective view of a control panel interface of the programmable laser device according to a preferred embodiment of the invention.
Figure 5:
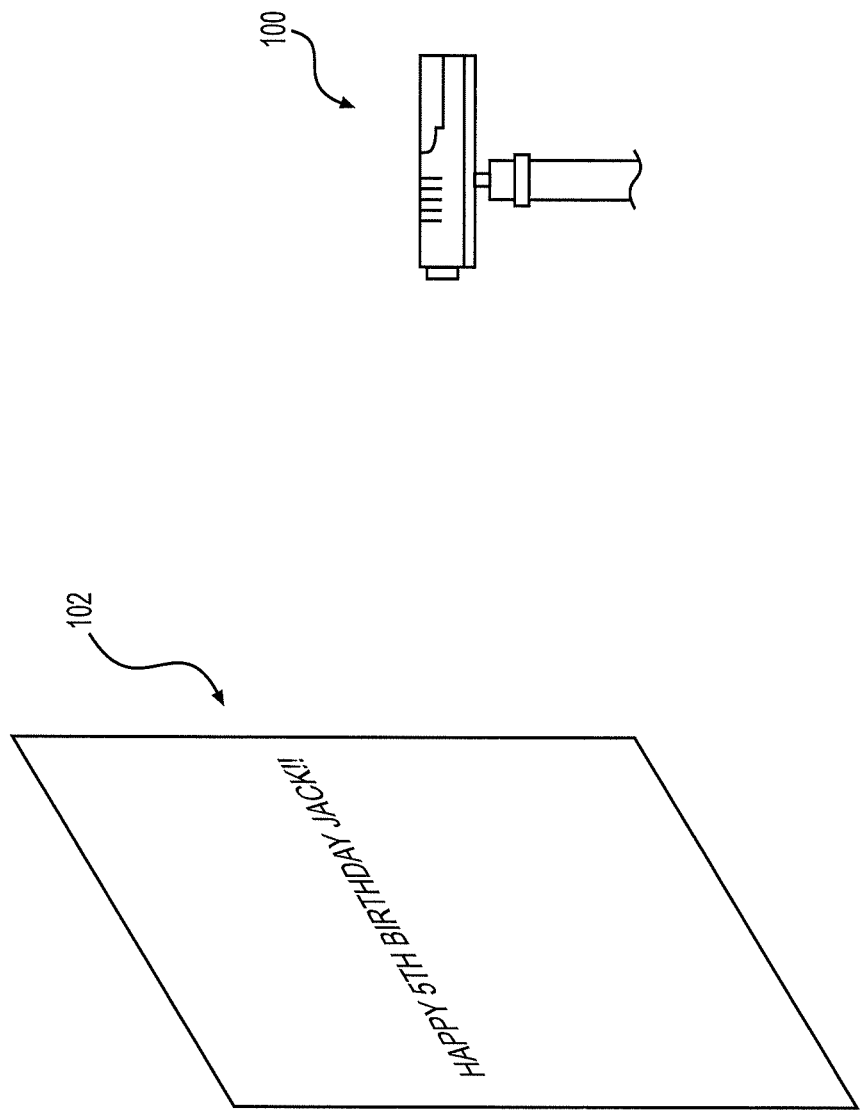
FIG. 5 illustrates the programmable laser device and a laser image according to a preferred embodiment of the invention.

As shown in FIGS. 3 and 4, the programmable laser device 100 includes a control panel 138. A control panel cover 140 is rotatably attached to the outer casing 130 of the programmable laser device 100. The control panel cover 140 covers a control panel display 142 that may comprise a touchpad keyboard 144. As shown in FIG. 4, for example, the laser image 102 that reads, "HAPPY 5TH BIRTHDAY JACK! !" can be programmed by touching characters 124, including letters, numbers, symbols, images, and/or animations, on the touchpad keyboard 144 in the control panel display 142, and hitting a "SEND" button 148. A laser image display portion 146 displays the laser image 102 that will be projected by the laser 108. The touchpad keyboard 144 may comprise a configuration of a QWERTY type keyboard, but other configurations are possible. By providing the touchpad keyboard 144 in the programmable laser device 100, it is possible to minimize the number of steps and, therefore, the time required to modify the laser image 102 projected by the programmable laser device 100, increasing convenience for a user. Alternatives to a touchpad keyboard 144 include a smartphone-controlled message inputting system, such that a user may program a personalized message to be displayed as a laser image 102 from a smartphone, or a traditional keyboard.

In addition to storing personalized messages as the laser images 102, the memory 106 is configured to store programs for animated and musical laser shows, and accompanying music, corresponding to holidays, such as Christmas, Halloween, Birthdays, and New Year's Eve/New Year's Day. Multiple shows comprising laser images 102 that may include messages, animations, or other objects, as well as music, may be stored for a particular holiday, such that a user can select programs for that holiday to be executed by the CPU 104 consecutively. For example, if the memory 106 stores twelve Christmas programs, each program consisting of a distinct laser animation show and accompanied by music, a user can select one or more of the twelve Christmas programs to be executed. In addition, a user can select programs by event, i.e., the programs are stored in the memory 106 and each program is associated with an event or a holiday. The memory 106 may be configured to store up programmed laser images 102.

The laser image 102 can project onto any surface to heights over twenty feet. A readable distance of the projected laser image 102 is fifty feet, and a coverage area of the projected laser image 102 is one hundred feet at a distance of thirty feet. Of course, the laser image 102 may be a laser video image, such as a laser animation show.

Although the invention has been described with reference to preferred embodiments, the invention is not limited to the disclosed preferred embodiments.

We claim:

1. A programmable laser device configured to project an image, the programmable laser device comprising:
   an outer casing;
   a lens provided on a side surface of the outer casing;
   a power switch that switches the programmable laser device between an ON state and an OFF state;
   a memory that stores one or more programs, each of the one or more programs corresponding to at least one image;
   a control panel having a control panel display that includes (a) a keyboard having character buttons and a SEND button, and (b) an image display portion configured to display the image to be projected, the control panel being configured to receive a user input for the image from one of (i) the character buttons input via the keyboard, and (ii) a user selection via the image display portion;
   a processor, wherein, when the programmable laser device is in the ON state, the processor is configured to receive the user input for the image from the control panel, and to output the user input for the image;
   a two-scanner system including an x-axis scanner and a y-axis scanner, the two-scanner system being configured to receive the user input for the image output by the processor, to translate the user input for the image, and to output the translated user input for the image;
   a laser configured to receive the user input for the image from the two-scanner system, and to output the image corresponding to the received user input; and
   a built-in over heat protection device having a timer, wherein, when the programmable laser device is in the ON state, and the timer reaches a predetermined running time, the built-in over heat protection device switches the programmable laser device from the ON state to the OFF state.

2. The programmable laser device according to claim 1, further comprising a control panel cover that is attached to the outer casing, the control panel cover configured to cover the control panel.

3. The programmable laser device according to claim 1, further comprising:
   a speaker, wherein the one or more programs stored in the memory include music, and, when the user input is a program, of the one or more programs, the speaker is configured to output the music; and
   a volume control portion configured to permit a user to increase and to decrease a volume of the music output by the speaker.

4. The programmable laser device according to claim 1, wherein the lens is formed of a translucent material.

5. The programmable laser device according to claim 4, wherein the lens is formed of one of plastic and glass.

6. The programmable laser device according to claim 1, wherein the keyboard of the control panel display is a touchpad keyboard.

7. The programmable laser device according to claim 1, further comprising a smartphone-controlled message inputting system configured to receive a user input for the image from a smartphone, wherein the processor is further configured to receive the user input for the image from the smartphone-controlled message inputting system.

8. A programmable laser device configured to project an image, the programmable laser device comprising:

an outer casing;
a lens provided on a side surface of the outer casing;
a power switch that switches the programmable laser device between an ON state and an OFF state;
a memory that stores one or more programs, each of the one or more programs corresponding to at least one image;
a control panel having a control panel display that includes (a) a keyboard having character buttons and a SEND button, and (b) an image display portion configured to display the image to be projected, the control panel being configured to receive a user input for the image from one of (i) the character buttons input via the keyboard, and (ii) a user selection via the image display portion;
a processor, wherein, when the programmable laser device is in the ON state, the processor is configured to receive the user input for the image from the control panel, and to output the user input for the image;
a laser configured to receive the user input for the image from the two-scanner system, and to output the image corresponding to the received user input; and
a built-in over heat protection device having a timer, wherein, when the programmable laser device is in the ON state, and the timer reaches a predetermined running time, the built-in over heat protection device switches the programmable laser device from the ON state to the OFF state,
wherein the timer is further configured to begin counting when the programmable laser device is switched from the ON state to the OFF state, up to a predetermined cooling time, and
wherein, after the timer reaches the predetermined cooling time when the programmable laser device is in the OFF state, the programmable laser device is configured to switch to the ON state.

9. A programmable laser device configured to project an image, the programmable laser device comprising:
an outer casing;
a lens provided on a side surface of the outer casing;
a power switch that switches the programmable laser device between an ON state and an OFF state;
a memory that stores one or more programs, each of the one or more programs corresponding to at least one image;
a control panel having a control panel display that includes a keyboard having character buttons and a SEND button, the control panel being configured to receive a user input for an image from one of (i) the character buttons input via the keyboard, and (ii) a user selection from the one or more programs;
a processor, wherein, when the programmable laser device is in the ON state, the processor is configured to receive the user input for the image from the control panel, and to output the user input for the image;
a two-scanner system including an x-axis scanner and a y-axis scanner, the two-scanner system being configured to receive the user input for the image output by the processor, to translate the user input for the image, and to output the translated user input for the image;
a laser configured to receive the user input for the image from the two-scanner system, and to output the image corresponding to the received user input.

10. The programmable laser device according to claim 9, wherein the control panel display also includes an image display portion that displays the image to be projected.

11. The programmable laser device according to claim 9, further comprising a built-in over heat protection device having a timer,
wherein, when the programmable laser device is in the ON state, and the timer reaches a predetermined running time, the built-in over heat protection device switches the programmable laser device from the ON state to the OFF state, and
wherein, when the programmable laser device switches from the ON state to the OFF state, and the timer reaches a predetermined cooling time, the programmable laser device is configured to switch to the ON state.

12. The programmable laser device according to claim 9, further comprising a control panel cover that is attached to the outer casing, the control panel cover configured to cover the control panel.

13. The programmable laser device according to claim 9, further comprising:
a speaker, wherein the one or more programs stored in the memory include music, and, when the user input includes a program, of the one or more programs, the speaker is configured to output the music; and
a volume control portion configured to permit a user to increase and to decrease a volume of the music output by the speaker.

14. The programmable laser device according to claim 9, wherein the lens is formed of a translucent material.

15. The programmable laser device according to claim 14, wherein the lens is formed of one of plastic and glass.

16. The programmable laser device according to claim 9, wherein the keyboard of the control panel display is a touchpad keyboard.

17. The programmable laser device according to claim 9, further comprising a smartphone-controlled message inputting system configured to receive a user input for the image from a smartphone, wherein the processor is further configured to receive the user input for the image from the smartphone-controlled message inputting system.

* * * * *